United States Patent Office 3,720,696
Patented Mar. 13, 1973

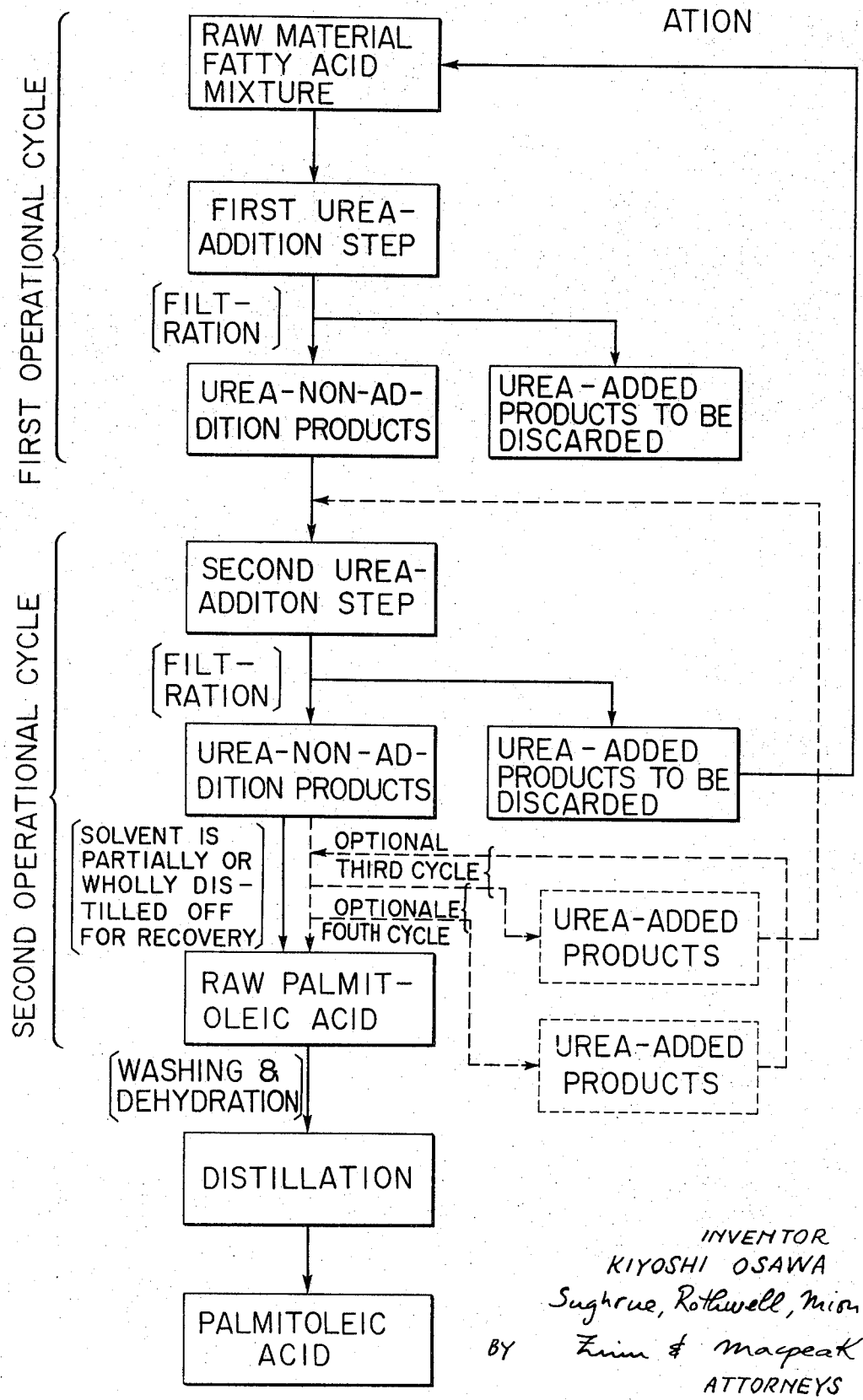

3,720,696
PROCESS FOR THE EXTRACTION OF
9-HEXADECENOIC ACID
Kiyoshi Osawa, Tokyo, Japan, assignor to Mimatu Kako
 Kabushiki Kaisha, Kanagawa-ken, Japan
Filed Aug. 6, 1970, Ser. No. 61,565
Int. Cl. C09f 5/00; C11c 1/08
U.S. Cl. 260—419　　　　　　　　　　　　　　13 Claims

ABSTRACT OF THE DISCLOSURE

The invention relates to a novel process for the isolation of 9-hexadecenoic acid from a fatty acid mixture containing the same. The improvement of the process resides in the use of a specific amount of urea (0.5–5 times) relative to the treating mixture, as a negative extraction agent for carrying out the desired isolation.

BACKGROUND OF THE INVENTION

Field of the invention

This invention relates to an improved process for the extraction of 9-hexadecenoic acid.

9-hexadecenoic acid (also known as hexadecenoic or palmitoleic acid) is a C–16-unsaturated fatty acid which is contained in animal and vagetable fats. Animal fat and oil contain generally 4–18 wt. percent 9-hexadecenoic acid, while vegetable fats and oils, such as palm oil and coconut oil, contain a substantially lesser amount, generally 0–2 wt. percent, of the acid under consideration.

Natural fats and oils contain a considerable amount of analogous fatty acids, the main constituent of which is generally oleic acid contained therein in an amount of about 20–30 wt. percent of the fatty acid mixture, the remaining about 70–80 wt. percent of the mixture comprising generally 5–8 kinds of fatty acids in amounts of about 10 to 10 and several wt. percent each.

According to the prior art, it is highly difficult to isolate 9-hexadecenoic acid from these natural fats and oils. This is naturally applicable to a mixture of synthesized or processed unsaturated fatty acids. These can be obtained by electrical or chemical synthesis of lower carbon fatty acids, or decomposition of higher carbon fatty acids.

A mixture of unsaturated fatty acids can also be obtained according to the prior art by for example fermenting saturated fatty acids with enzymes having a dehydrating power, preferably dehydrogenase.

Although 9-hexadecenoic acid is valuable and is used such as foodstuffs in various fields, medicines, paints, lubricants, surfactants and the like, this acid per se or its derivatives have not yet been practically used in its isolated state, possibly on account of the aforementioned technical difficulty in isolation technology. For this reason, the unsaturated fatty acids which have been mostly used are C–18 acids such as oleic acid, linoleic acid, or linolenic acid. In consideration, however, of broad and valuable usage not only of C–18 saturated acids, stearic acid being representative thereof, but also C–6 (caproic acid), C–8 (caprylic acid), C–10 (capric acid), C–12 (lauric acid), C–14 (myristic acid), C–16 (palmitic acid) and the like fatty acids, the corresponding unsaturated fatty acids will find their use in various purposes and thus constitute important fatty acids. In fact, various interesting studies not only in fatty acid compositions contained in human and cow milk, but also in the metabolism of lipoid in plasma, show that a vast utilization of these unsaturated fatty acids is expected nowadays with definite certainty. In the recently developed field of biochemistry, it has already been found that these unsaturated fatty acids are highly effective to accelerate the growth of yeast when added to culture mediums. It has also been proposed to use 9-hexadecenoic acid in the preparation of cosmetics in consideration of the fact that the acid constitutes a main component of human smegma.

As already referred to, the content of 9-hexadecenoic acid in natural fat and oil, and processed or synthesized mixtures having similar compositions is very small and instead, the content of analogous fatty acids is rather high so that the conventional separating processes such as those relying upon fractional crystallization, fractional distillation or both, may be employed only with inferior results.

Recently, the urea-adding process has been developed and utilized broadly and profoundly for the refining of raw materials as well as the fractional separation thereof into constituents in the petroleum, oil and fat and the like industries. In this process, urea or thiourea per se or a solution thereof is brought into contact with the raw material mixture such as petroleum oils, fats or oils, and the thus developed urea-addition products are separated and further treated for carrying out the desired refinery or separation. A predominant feature of the present process is such that a mixture composed of constituents having closely approaching melting points or boiling points, yet different molecular structures, can be effectively separated into constituents, indeed, at normal pressure and normal temperature.

The separation process can be utilized especially advantageously for separations between straight chain and branched chain compounds; saturated and unsaturated compounds; and between those compounds having different degrees of unsaturation. In the case of separation of compounds having different numbers of carbon atoms, it is said that the distillation process is rather preferential over the urea-addition process.

When the urea-addition process is applied to a two-component system for the abovementioned purpose, and if one component thereof is not capable of forming an addition product with urea, the system could be separated perfectly into its components. In practice, however, if the operating conditions are selected such that the component capable of forming the urea-addition product is completed separated from the system, the remaining or difficult-adding component is also accompanied by the addition product.

The very difficulty in the realization of a complete or successful separation of 9-hexadecenoic acid from a multi-component system containing the same, such as natural fat or oil, resides in the above cause.

Natural fat containing 9-hexadecenoic acid comprises generally more than twenty kinds of fatty acids from C–3 to C–24. The main constituents thereof are the C–12, C–14 and C–16 saturated fatty acids of C–12, and five unsaturated fatty acids: C–14, C–16, C–18, C–20 and C–22.

It may well be supposed by one skilled in the art, from the knowledge of the currently accepted theory of the urea-addition process, that when a multi-component system such as natural fat is processed through a urea-addition step, the saturated acid components will form the corresponding urea-addition products and can be separated as deposits, while the unsaturated components will remain in the system as per se or in the form of the non-additional components, thereby providing a sharp separation between both components. According to our practical experiments, however, the progress is not so simple as may be expressed in the abovementioned way, but rather practically in every case a sharp and exclusive separation of the saturated acid components only cannot be performed. As an example, when processed under such gentle operating conditions that 50 wt. percent of stearic acid, 70 wt. percent of palmitic and more than 90 wt. percent of myristic acid may be remained in the non-addition components in the system, the ratio of saturated acids and unsaturated acids preserved in the urea-addition products amounts to 4:6. Or more specifically, the content of the unsaturated acid components which are conventionally believed to have a substantial affinity with urea and thiourea is larger than the saturated acid components. As a second example, when the system is processed under such conditions that almost all (higher than 90 wt. percent) of the saturated acid components are transformed into the corresponding urea-added products liable to be separated by deposition, the ratio of saturated acids and unsaturated acids in the added products amounts to 3:7, as a representative example. Therefore, in this case, the amount of unsaturated acids is overwhelmingly larger than the saturated acids.

Experiments on individual acids indicate that it is more difficult to form urea-added products of short chain saturated acids such as C–12 and C–14 than long chain unsaturated acids such as C–20 and C–22. The reason may be explained as follows:

In comparison with saturated fatty acids, unsaturated fatty acids have generally longer carbon chains. Secondly, a representative example of natural fat which is used for the urea-adding treatment as referred to above contains in advance of said treatment, a ratio of saturated acids to unsaturated acids of 2:8, thus showing an overwhelmingly larger content of unsaturated acid components. The longer chain unsaturated acid is more liable to form the corresponding urea-added product than the shorter chain saturated acid. It has been further found that if the urea-adding ability is substantially the same, the component which occupies a higher content in the treating material is more liable to react with urea and/or thiourea than the remainder, thus representing a larger amount of the corresponding urea-added product.

It may be therefore concluded with certainty that in the case of a multicomponent system of natural, processed or synthesized fatty acid mixtures, the urea-adding process for performing the desired separation should be carried out, not only by relying upon the difference of the saturated and unsaturated nature of the acid components, but also by observing the specific and relative difference in the urea-adding performance owned by the respective component. The selection of the treating conditions must naturally be varied depending upon the occasional acid composition of the treating fatty acid material.

It is thus a principal object of the invention to provide a highly efficient and improved process for the present separation of 9-hexadecenoic acid from fatty acid mixtures containing the same in a low amount, the process being carried into effect at a high yield and with a high purity of the 9-hexadecenoic acid or its derivative.

SUMMARY OF THE INVENTION

The present invention provides a process for separating and recovering 9-hexadecenoic acid from mixtures containing the same comprising treating the mixture with urea and recovering the 9-hexadecenoic acid from the non-uera-addition products after removing the urea-addition products by, e.g., filtration. The urea is preferably employed in the form of a solution in an inert solvent, which can be recovered by distillation. The process may be conducted continuously over several cycles.

BRIEF DESCRIPTION OF THE DRAWING

The figure is a schematic diagram showing a continuous form of the present process.

DESCRIPTION OF THE PREFERRED EMBODIMENTS

For carrying out the process according to this invention, the urea is used as per se or in the form of a solution thereof. The solvent may be any one of conventionally used organic solvents, such as, for instance, an alcohol, a ketone, benzene, trichlene or the like. Water or an aqueous solution of an organic solvent may also be utilized. The preferable solvent may among others, be an alcohol, a ketone, a water/alcohol mixture or a water/ketone mixture.

With use of urea per se, the process is more simple and generally convenient and economical in practice on account of the absence of a solvent, but the selectivness and the yield become rather inferior in comparison with the corresponding solvent system.

On the other hand with, the solvent system of the urea-addition treatment, the selectiveness becomes more superior than otherwise and provides a possibility of performing a continuous process, thereby assuring a rather higher operational efficiency and with a higher purity of the separated 9-hexadecenoic acid.

The continuous processing of the fatty acid mixture may preferably be carried into effect in the following way.

According to our practical experiments, it has been found that a still more improved effect may be obtained by carrying out the process in a continuous way. In this case, a urea solution is added to the material acid mixture, the urea solution has such a concentration that the 9-hexadecenoic acid can remain in the non-urea-added products, for removal of the to-be-discharged acid components in the form of urea-added products which are then filtered off. The filtrate is then subjected to distillation for partial removal of the solvent for recovery, and the residual is cooled and subjected again to the urea-adding procedure.

The above operational cycle consisting of urea-addition, filtration, partial recovery of solvent through distillation, cooling and readdition of urea is then repeated continuously twice or more, for obtaining the desired 9-hexadecenoic acid in the form of urea-non-addition state and at a high purity.

On the other hand, the urea-added products appearing in the second and further processing cycles are recovered for recirculation and for improving the final yield.

Briefly, the main features of the continuous mode of operation of the inventive process are:

(1) Use of the urea solution in a concentration capable of leaving the desired hexadecenoic acid component always in the non-urea-added or solvent phase.

(2) Partial distillation of the solvent from the filtrate and formation of the urea-added component by the utilization of the remaining dissolved urea and always in a continuous way.

(3) Recovery of the desired component from the urea-added reaction products.

(4) In the progress of said recovery stage (3), the urea-added products are not dissolved into the urea and the desired substance, but these products are added per se with the solvent or the urea solution for the desired recovery through a heating step with agitation.

The distillation (of the filtrate) may be carried out either after the urea-adding step, or in advance thereof. In the first case, the process can be carried out in the following way:

The urea is added to the fatty acid mixture in a quantity of 1–5 times, advantageously 1.5–3 times, based by weight on the latter.

When using a solution of urea, the urea is added with an organic solvent and dissolved therein at a temperature less than 100° C. The adding quantity of the solvent varies depending upon the quantity of urea and urea-adding temperature to a certain degree. However, the use of solvent in the range of 1–5 times relative to the urea is recommendable, the concentration being advantageously higher than the saturation point.

The reaction mixture comprising raw material and urea per se or urea-solution is generally agitated at a temperature less than 100° C. Under extreme conditions, agitation or heating procedure only would serve for the reaction purpose.

The reaction mixture, when subjected to said heating procedure, is gradually cooled down to room temperature, and when desired, intentionally cooled to 0–10° C., for accelerating the sedimentation of the urea-added products which are then filtered off under reduced pressure. The filtrate is distilled for recovery of the solvent and washed with water for removal of residual urea, and then dehydrated to provide raw 9-hexadecenoic acid.

When urea per se is used in place of a solution thereof, said filtrate per se provides the desired raw 9-hexadecenoic acid.

The raw 9-hexadecenoic acid is then subjected to a refining step by passing it through a distillation equipment having a fractioning tower, so as to provide a high purity 9-hexadecenoic acid.

When the process is carried out in the continuous mode for improving the final yield, as briefly referred, above, the raw material is subjected to a urea-addition treatment, filtration in vacuo, partial distillation of the solvent for recovery, gradual cooling and further optional cooling to 0–10° C. for performing a secondary urea-addition, in the first operational cycle.

The reaction mixture is then filtered to separate the deposited urea-addition products, while the filtrate is partially distilled for the recovery of part of the solvent, gradually cooled, for performing a third addition of urea, and so on.

The above-mentioned urea-adding, the filtration, the partial recovery of solvent from the filtrate and the cooling of the reaction mixture for re-addition of urea, consisting one operational cycle, as was referred to above, is repeatedly carried out to a desired degree and in a continuous way.

The last filtrate is completely distilled off and the remaining urea is removed by washing the residual with water. The thus obtained final product is dehydrated to provide raw 9-hexadecenoic acid.

The urea-added products appearing at the last stage of the first operational cycle, are added with a solvent or urea-solution, heated up to dissolve under agitation, gradually cooled and occasionally further cooled to 0–10° C., and subjected to filtration in vacuo for removal of the addition products. The filtrate is then added to the first step filtrate for recirculation.

If the filtrate has at any stage a satisfactory concentration of raw 9-hexadecenoic acid, then the solvent is perfectly distilled for recovery and the residual is washed with water for removal of urea and dehydrated for providing the raw 9-hexadecenoic acid.

The third and further urea-addition products may be treated in a similar way as described above.

In the second type operation mode, wherein the distillation is carried into effect in advance of urea-addition, the process can be advantageously performed in the following way:

In this case, the raw material or fatty acid mixture is subjected at first to distillation under reduced pressure in distillation equipment having a fractioning tower, thereby removing fractional distillates comprising C–10 to C–14 components and C–18 to C–24 components as much as possible.

Urea is added to the distillation residual in an amount of 0.5–3.5 times, preferably 1–2.5 times by weight of the residual.

When a urea solution is to be used, a corresponding quantity of an inert organic solvent is added at a temperature less than 100° C. The added quantity varies with the additional quantity of urea and the reaction temperature, but 1–5 times the urea are highly recommendable.

The concentration of the urea-solution must preferably be higher than the saturation point.

Further operational conditions are the same as before and no further analysis of the present operational mode would be necessary for a better understanding of the inventive process. The continuous multi-cycle operation is also possible following the foregoing corresponding disclosures.

The accompanying sole drawing represents a chart of a continuous operation mode described hereinbefore wherein, however, the distillation is performed after the final urea-addition step. This chart represents a standard two cycle system with optionally a third and a fourth cycle.

EXAMPLE 1

A natural and commercially procured natural fatty acid mixture, as the treating material, neutralization value: 186.3; iodine value: 72.5; 9-hexadecenoic acid content 17.8% as determined by gas chromatographic analysis, 300 g., was introduced into a solution of urea, 600 g., in 1,200 cc. of methanol prepared at less than 100° C., and stirred and cooled to room temperature. The reaction mixture was left alone overnight (for about 12 hours) and the thus formed urea-addition products were separated off by filtration under reduced pressure. The separated urea-addition products were washed twice with 300 cc. of a saturated urea solution and the washing liquid (methanol) was returned to the filtrate.

From the combined liquid, 900 cc. of methanol were distilled off for recovery and the residual was cooled down to room temperature under stirring.

The residual liquid was filtered again for removal of the sedimented products. The filtrate was distilled for complete recovery of methanol, added with water, extracted with ether, washed again with water flash out the remaining urea and dehydrated. Upon separation of ether by distillation, raw 9-hexadecenoic acid, 75.6 g. was obtained.

The second urea-added products were heated together with 200 cc. of methanol at less than 100° C. for dissolution, and the reaction mixture was cooled down to room temperature and further cooled at 3–5° C. for accelerating the additional reaction. The mixture was then filtered under reduced pressure and the deposits or the addition products were filtered under reduced pressure, the filter cake was washed twice with 30 cc. of saturated urea solution (methanol), the washing liquor being returned to the system. On the other hand, the filtrate was distilled for complete recovery of methanol, and the residual was added with water, extracted with ether for removal of the remaining urea, dehydrated, and the ether distilled off. In this way, 7.2 g. of raw 9-hexadecenoic acid were obtained.

These raw 9-hexadecenoic acids were combined together and then distilled under reduced pressure in distillation equipment fitted with a fractionator.

The thus purified palmitoleic acid amounted to 39.9 g. Analytical results of the final products were:

Neutralization value _____ 214.9
Iodine value: (Wijs method) _____ 95.8
Purity (gas chromatographic process) (percent) __ 70.2
Yield (percent) _____ 52.5

EXAMPLE 2

A fatty acid mixture, as the treating material, neutralization value: 186.3; iodine value: 72.5; 9-hexadecenoic acid content 17.8% as determined by gas chromatographic analysis, 300 g., was introduced in a solution of urea, 750 g., in 1,500 cc. of methanol prepared at less than 100° C., and stirred and cooled to room temperature. The reaction mixture was left alone overnight (for about 12 hours) and the thus formed urea-addition products were separated off by filtration under reduced pressure. The separated urea-addition products were washed twice with 300 cc. of a saturated urea solution (methanol) and the washing liquid was returned to the filtrate.

From the combined liquid, methanol was distilled off for full recovery of methanol and the residual was added with water, extracted with ether, washed again with water flash out the remaining urea and dehydrated. Upon separation of ether by distillation, raw 9-hexadecenoic acid, 72.1 g., was obtained.

The raw products were then distilled under reduced pressure in distillation equipment fitted with a fractionator. The thus purified 9-hexadecenoic acid amounted to 33.3 g. Analytical results of the final products were:

Neutralization value _____ 215.7
Iodine value _____ 96.3
Purity (percent) _____ 69.3
Yield (percent) _____ 43.2

EXAMPLE 3

A fatty acid mixture, as the treating material, neutralization value: 185.1; iodine value: 73.0; 9-hexadecenoic acid content 16.3% as determined by gas chromatographic analysis, 300 g., was added with urea, 750 g., and stirred for about 1 hour at less than 100° C. and then cooled down to room temperature. The reaction mixture was left alone at 3–5° C. overnight (for about 12 hours) and the thus formed urea-addition products were separated off by filtration under reduced pressure. The non-urea-added residual, 118.4 g., was then distilled under reduced pressure in distillation equipment fitted with a fractionator. The thus purified 9-hexadecenoic acid amounted to 19.5 g.

Analytical results of the final products were:

Neutralization value _____ 211.2
Iodine value _____ 91.5
Purity (percent) _____ 60.7
Yield (percent) _____ 24.2

EXAMPLE 4

A fatty acid mixture, neutralization value: 186.3; iodine value: 72.5; containing 17.8% of 9-hexadecenoic acid as determined by gas chromatography, was subjected to a fractional distillation at a reduced pressure of 1–2 mm. Hg, into six successive fractions numbered "1"–"6."

The numbers correspond to the lower boiling points.

After being gas-chromatographed, fractions "3" and "5" were re-distilled into three new fractions, and then the former fraction "4" and the new fractions "2" were combined together for use as the treating fatty acid mixture, 80.1 g., containing 39.4 wt. percent of 9-hexadecenoic acid.

Then, the thus prepared mixture was introduced in a solution of urea, 100 g., in 250 cc. of methanol prepared at less than 100° C., and stirred for further 30 minutes and cooled down to room temperature and further cooled to 3–5° C. The thus formed urea-addition products were separated off by filtration under reduced pressure. The separated urea-addition products were washed twice with a saturated urea solution. The filtrate was distilled for perfect removal of the solvent.

Then, the residual was added with water, extracted with ether, washed again with water flash out the remaining urea, and dehydrated. Upon separation of ether by distillation, raw 9-hexadecenoic acid, 38.1 g., was obtained.

Analytical results of the final products were:

Neutralization value _____ 210.3
Iodine value _____ 92.3
Purity (percent) _____ 60.3
Yield (percent) _____ 43.0

EXAMPLE 5

A natural and commercially procured natural fatty acid mixture, as the treating material, neutralization value: 186.3; iodine value: 72.5; 9-hexadecenoic acid content 17.8% as determined by gas chromatographic analysis, 300 g., was introduced in a solution of urea, 150 g., in 375 cc. of methanol prepared at less than 100° C., and stirred and cooled to room temperature. The reaction mixture was left alone overnight (for about 12 hours) and the thus formed urea-addition products were separated off by filtration under reduced pressure. The separated urea-addition products were washed twice with 300 cc. of a saturated urea solution and the washing liquid (methanol) was returned to the filtrate.

The combined liquid was treated as before to provide 203 g. of raw 9-hexadecenoic acid. Upon being distilled under reduced pressure, purified a final product, 49.0 g., was obtained.

Analytical results of the final products were:

Neutralization value _____ 206.2
Iodine value _____ 89.2
Purity (percent) _____ 48.2
Yield (percent) _____ 44.2

EXAMPLE 6

A natural and commercially procured natural fatty acid mixture, as the treating material, neutralization value: 185.1; iodine value: 73.0; 9-hexadecenoic acid content 16.3% as determined by the gas chromatograhpic analysis, 300 g., was introduced in a solution of urea, 1,500 g., in 3,600 cc. of methanol prepared at less than 100° C., and stirred and cooled to room temperature. The reaction mixture was left alone overnight (for about 12 hours) and the thus formed urea-addition products were separated off by filtration under reduced pressure. The separated urea-addition products were washed twice with 200 cc. of a saturated urea solution and the washing liquid (methanol) was returned to the filtrate.

From the combined liquid, methanol was distilled off for recovery and the residual was cooled down to room temperature under stirring.

Further treatments were carried out in the same manner as described in Example 5.

Raw product: 42 g.
Refined product: 18.1 g.

Analytical results of the final products were:

Neutralization value _____ 220.2
Iodine value _____ 99.6
Purity (percent) _____ 69.6
Yield (percent) _____ 23.6

The embodiments of the invention in which an exclusive property or privilege is claimed are as follows:

1. A process for the separation and recovery of 9-hexadecenoic acid from a fatty acid mixture containing the same, said process comprising:
    (a) adding to said mixture from 1 to 5 times by weight, based on the weight of said mixture, of urea to form a reaction product containing urea-addition products and said 9-hexadecenoic acid;
    (b) separating said urea-addition products from said reaction products; and
    (c) recovering said 9-hexadecenoic acid.

2. The process of claim 1, wherein said urea-addition products are separated from said reaction products by filtration under reduced pressure.

3. The process of claim 2, wherein said 9-hexadecenoic acid is recovered by distillation.

4. A process for the separation and recovery of 9-hexadecenoic acid from a fatty acid mixture containing the same, said process comprising:
    (a) forming a first mixture of said fatty acid mixture and a solution of urea in an inert solvent, said first mixture containing from 1 to 5 times by weight, based on the weight of said fatty acid mixture, of urea, the concentration of urea in said solution being greater than the saturation point thereof;
    (b) heating said first mixture, with agitation, at a temperature less than 100° C. to form a reaction product containing precipitated urea-addition products and said 9-hexadecenoic acid;
    (c) separating said urea-addition products from said reaction products by filtration thereof to form a filtrate;

(d) separating at least part of said solvent from said filtrate by distillation thereof to provide raw 9-hexadecenoic acid; and (e) recovering said 9-hexadecenoic acid from the raw products by distillation.

5. The process of claim 4, wherein said process is conducted continuously and wherein steps (a)–(e) are repeated at least once.

6. The process of claim 5, wherein the urea-addition products derived from the second cycle are recycled to said first mixture in said first cycle of operation.

7. The process of claim 5, wherein between steps (b) and (c), the reaction product is cooled to a temperature of from 0–10° C.

8. The process of claim 5, wherein said solvent is selected from the group consisting of an alcohol, a ketone, benzene, trichlene, a water/alcohol mixture and a water/ketone mixture.

9. The process of claim 4, wherein the solvent in said solution is present in an amount of from 1 to 5 times by weight, based on the weight of said urea in said solution.

10. The process of claim 5, wherein after step (d) and before step (e), the filtrate is washed with water to remove residual urea therefrom and then dehydrate to provide said raw product.

11. The process of claim 7, wherein additional urea is added to said reaction product after step (b) and before step (c).

12. The process of claim 5, wherein the urea-addition products separated in step (c) are mixed with a solvent therefor or a urea solution, heated to dissolve the urea-addition products therein, with agitation, cooled to at least room temperature, filtered and wherein the filtrate is then added to the filtrate produced by step (c).

13. The process of claim 5, wherein, prior to step (a), said fatty acid mixture is subjected to distillation under reduced pressure in order to remove as much as possible of the $C_{10}$ to $C_{14}$ and $C_{18}$ to $C_{24}$ components, and wherein to the resulting product is added from 0.5 to 3.5 times by weight, based on the weight of said resulting product, of urea.

References Cited

UNITED STATES PATENTS

| | | | |
|---|---|---|---|
| 3,052,699 | 9/1962 | Beal | 260—413 |
| 3,257,438 | 6/1966 | Wicke, Jr., et al. | 260—413 |

LEWIS GOTTS, Primary Examiner

J. R. BROWN, Assistant Examiner

U.S. Cl. X.R.

260—412, 412.8